United States Patent
Mehnert

(10) Patent No.: US 11,521,375 B2
(45) Date of Patent: Dec. 6, 2022

(54) METHOD AND SYSTEM FOR IMPROVED OBJECT MARKING IN SENSOR DATA

(71) Applicant: Robert Bosch GmbH, Stuttgart (DE)

(72) Inventor: Jens Eric Markus Mehnert, Malmsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/054,692

(22) PCT Filed: Sep. 3, 2019

(86) PCT No.: PCT/EP2019/073385
§ 371 (c)(1),
(2) Date: Nov. 11, 2020

(87) PCT Pub. No.: WO2020/048940
PCT Pub. Date: Mar. 12, 2020

(65) Prior Publication Data
US 2021/0081668 A1 Mar. 18, 2021

(30) Foreign Application Priority Data
Sep. 4, 2018 (DE) .......................... 102018214979.8

(51) Int. Cl.
*G06V 20/00* (2022.01)
*G06V 30/194* (2022.01)

(52) U.S. Cl.
CPC ............ *G06V 20/00* (2022.01); *G06V 30/194* (2022.01)

(58) Field of Classification Search
CPC ........ G06K 9/00624; G06K 9/66; G06K 9/62; G06F 15/18; G06F 17/24; G06N 7/00; H04N 5/232; G06T 11/60
See application file for complete search history.

(56) References Cited

U.S. PATENT DOCUMENTS 9,734,455 B2   8/2017 Levinson et al.
10,169,680 B1 * 1/2019 Sachdeva ............ G06F 3/04845
(Continued)

FOREIGN PATENT DOCUMENTS

CN        107578069 A     1/2018

OTHER PUBLICATIONS

International Search Report for PCT/EP2019/073385, dated Nov. 21, 2019.
(Continued)

*Primary Examiner* — Nancy Bitar
(74) *Attorney, Agent, or Firm* — Norton Rose Fulbright US LLP; Gerard Messina

(57) ABSTRACT

A method and a system for improved object marking in sensor data, as the result of which an at least partially automated annotation of objects or object classes in a recorded data set is possible. The method provides that a scene is detected in a first state by at least one sensor. An association of a first object marking with at least one object contained in the scene in a first data set containing the scene in the first state then takes place. The similar or matching scene is subsequently detected in a second state that is different from the first state by the at least one sensor, and an at least partial acceptance of the first object marking, contained in the first data set, for the object recognized in the second state of the scene as a second object marking in a second data set takes place.

9 Claims, 2 Drawing Sheets

(56) References Cited

U.S. PATENT DOCUMENTS

| | | | |
|---|---|---|---|
| 10,691,943 B1* | 6/2020 | Ferstl | G06N 3/0445 |
| 10,866,588 B2* | 12/2020 | Buch | G05D 1/0088 |
| 2018/0176474 A1* | 6/2018 | Blanco | H04N 5/23293 |
| 2019/0026558 A1* | 1/2019 | Tanigawa | G06T 15/205 |

OTHER PUBLICATIONS

Ce Liu et al., "Nonparametric Scene Parsing: Label Transfer Via Dense Scene Alignment," 2009 IEEE Conference on Computer Vision and Pattern Recognition: CVPR 2009, IEEE, 2009, pp. 1-8.

Budvytis Ignas et al., "Large Scale Labelled Video Data Augmentation for Semantic Segmentation in Driving Scenarios," 2017 IEEE International Conference on Computer Vision Workshops (ICCVW), IEEE, 2017, pp. 1-8.

Zhuo Xiangyu et al., "Building Detection and Segmentation Using a CNN With Automatically Generated Training Data," IGARSS 2018—2018 IEEE International Geoscience and Remote Sensing Symposium, IEEE, 2018, pp. 3461-3464.

Wikipedia: "Deep Learning", accessed Aug. 31, 2018, URL: https://en.wikipedia.org/w/index.php?title=Deep_learning&oldid=857463948, pp. 1-26.

Yu, et al.: "BDD100K: A Diverse Driving Video Database with Scalable Annotation Tooling", arXiv preprint arXiv: 1805.04687, May 12, 2018, pp. 1-16.

* cited by examiner

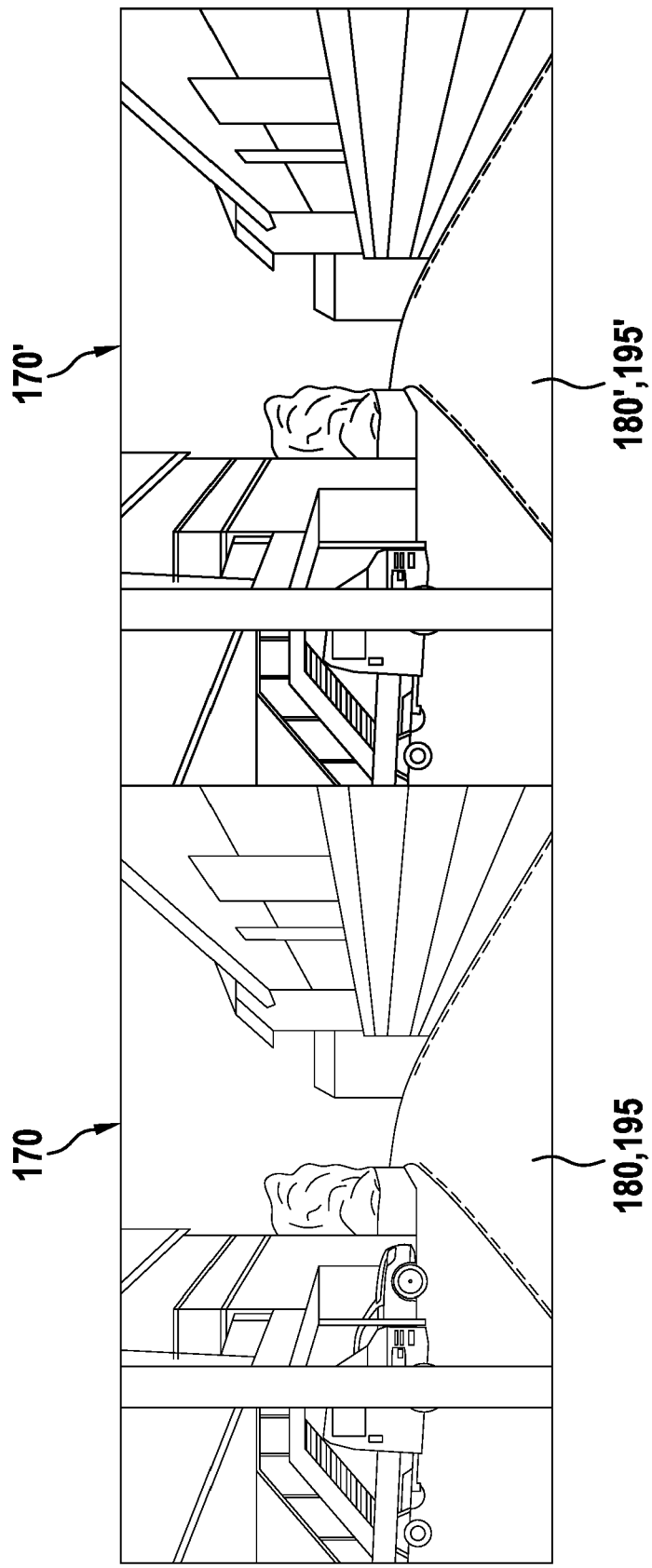

METHOD AND SYSTEM FOR IMPROVED OBJECT MARKING IN SENSOR DATA

FIELD

The present invention relates to a method and a system for object marking in sensor data.

BACKGROUND INFORMATION

In the field of machine learning, training data sets which may contain image and/or video data, for example, are frequently used, for example to learn automatic object recognition in such or similar data. One example of a possible use of such automatic object recognition may be an autonomous driving or flight operation in order to recognize objects in the vehicle surroundings. A large number of training data sets may be necessary to ensure a reliable object recognition.

Objects that are identified in a (training) data set are often classified, marked, or labeled, and form an object-label pair that may be processed by machine for machine learning. For example, in a data set in which a scene of a traffic situation is detected, a roadway course as an object may be provided with a marking that labels or classifies the roadway course as such. In particular the generation of such image and video annotations, i.e., the object marking in image and video data sets, may be costly, since automating this task may be very limited or not possible at all. Therefore, such image and video annotations are carried out predominantly by human operators, as the result of which, for example, annotating a recorded image for semantic segmentation may on average take more than an hour.

SUMMARY

An object of the present invention is to provide an option for simplified or more cost-effective provision of data containing object markings or annotations.

This object may be achieved by a method and a system for object marking in sensor data according to example embodiments of the present invention. Advantageous refinements of the present invention are described herein.

Such a method for object marking in sensor data may be used in particular to generate one or multiple training data sets for machine learning. In accordance with an example embodiment of the present invention, the method includes the following steps:

A scene in a first state is initially detected by at least one sensor. The scene may be, for example, a vehicle surroundings, a roadway image, a roadway course, a traffic situation, or the like, and may include static objects and/or objects such as traffic areas, buildings, road users, or the like. The sensor may be an individual optical sensor such as a camera, a LIDAR sensor, or a combination of such or similar sensors.

A first object marking, for example a first annotation, is associated with at least one object contained in the scene in a first data set containing the scene in the first state. The first data set may contain an image or an image sequence that depicts the scene in its first state, i.e., that contains an image of a roadway course, for example. The first object marking may, for example, frame, fill, or inscribe the object or characterize it in some other way, preferably optically. Thus, strictly by way of example, the roadway course may be traced in a machine-readable manner. In other words, the object and the object marking may form an object-label pair that is processable with machine learning, for example. The object marking may be associated with a certain object class such as roadway, tree, building, traffic sign, pedestrian, or the like.

In addition, the similar or at least essentially matching scene is detected in a second state, which is different from the first state, by the at least one sensor. In the simplest case, this may mean, for example, that a roadway is traveled on at least twice and detected by the sensor, in this case it being possible at different times of day, for example, to distinguish the first state from the second state. As described above, one or multiple objects of the scene in the first state, such as a roadway course, are already marked.

An at least partial acceptance of the first object marking, contained in the first data set, for the object (re-)cognized in the second state of the scene as a second object marking in a second data set then takes place. From a graphical standpoint, in the above-mentioned example of a roadway course this roadway course may already be traced. Of course, in principle this method may be repeated using an arbitrary number of data sets and/or states.

By use of this method it is possible to reduce the costs for providing data that contain object markings or annotations. Thus, at least not all object markings have to be completely recreated for the second (third, fourth, etc.) data set. Rather, this task need only be carried out once, the second data set then being derivable from same. From a graphical standpoint, a location to be detected, for whose image content an annotation already exists, may be redetected in one or multiple other states, the task of annotating being carried out only initially. If the location is to be present in detected form in the daytime and in the nighttime for training a function by machine learning, in this case it would be sufficient, for example, to place an object marking only in the daytime scene, and to accept it for the nighttime scene. Thus, a plurality of training data may be generated based on an object-label pair that is present, without incurring costs in each case for the annotation.

One refinement of the present invention provides that for recognizing the scene in the second data set, a piece of location information of the scene is associated with the first data set. The location information may be provided, for example, by a suitable sensor, such as by GPS or the like. In this way, the scene may be more easily recognized, or a data set may be more easily associated with a certain scene.

According to another refinement of the present invention, sensor data may also be fused in order to provide the location information. For example, this may be based on a combination of GPS and an intrinsic camera, for example in the form of calibration data of the camera or the like. In addition, proper motion data of a vehicle may be taken into account. The recognition may be even further improved in this way.

Another refinement of the present invention provides that for recognizing the scene in the second data set, a piece of viewing angle information and/or a piece of position information of the scene is/are associated with the first data set. This may also take place in addition to the association of a piece of location information, and may take place based, for example, on a piece of proper motion data of a vehicle, by GPS data, an intrinsic camera, or the like. The recognition is even further improved in this way.

According to one refinement of the present invention, a depth prediction, for example monocular, may be carried out by a stereo depth estimation, an estimation of the optical flow, and/or based on LIDAR data, of the image that already includes the first object marking, i.e., based on the first data set. A prediction of a semantic segmentation in the unknown image, i.e., the second data set, may also be carried out.

One refinement of the present invention provides that the object marking or the label is transformed in order for the object marking to more precisely fit the new image of the second data set. This transformation is also known as "warping."

According to another refinement of the present invention, a simultaneous localization and mapping (SLAM) method may be used to obtain a better location and position determination.

The effort for the object marking or annotation may be particularly significantly reduced when the acceptance of the first object marking takes place at least partially automatedly by an artificial intelligence module (AI module for short). This AI module may include at least one processor and may be configured, for example via programming instructions, to simulate human-like decision-making structures in order to independently solve problems, for example the automatic object marking or the annotation in the present case.

For a particularly high performance level of the example method, it has proven advantageous when at least one artificial neural network, which may have a multilayer and/or convoluted design, of the AI module determines matching image areas of the scene in the first and second data sets.

One refinement of the present invention provides that the artificial neural network may provide a pixel-by-pixel match mask as output. This may form a good basis for manual, semiautomatic, or completely automatic further processing.

To save even further on costs, the AI module may be trained by the first and/or second data set, for which purpose these data sets may be supplied to the AI module as a training data set.

According to another refinement of the present invention, at least one distinguishing feature of the scene between the first state and the second state may be determined, preferably using a SLAM method, and the second object marking may be associated with the distinguishing feature. This is possible at least when the distinguishing feature, for example the difference class, already has sufficiently good quality (for example, a statistical test with a high confidence level) and the comparative network shows a match for the remaining image content of the scene. An option may then be provided, for example, to automatically accept the object marking, i.e., the annotation. In other words, based on the above-mentioned artificial neural network or some other artificial neural network, for example, a prediction may be carried out using existing training data in order to detect possible changes in the scene. Since for the scene an image-label pair already exists in the training data, high prediction quality may be achieved. A difference between the annotation and the prediction indicates which objects must be reannotated.

One refinement of the present invention provides that the scene in the second state may be detected via an image sequence, and an unfavorable position from which the scene in the second state is detected may be compensated for, based on at least one single image situated before and/or after the single image to be marked.

For example, the first state and the second state of the scene may differ due to weather conditions, light conditions, or the like. For example, the scene may be detected again under visibility conditions that are impaired, compared to sunny weather, due to fog, at night, or the like.

According to another refinement of the present invention, the second state may provide, for example when the second state includes darkness, poor visibility conditions, or the like, that one or multiple objects of the scene in the second data set is/are not (or no longer) visible. Such nonvisible areas in this case may be appropriately marked or annotated, or automatically excluded based on a signal-to-noise ratio, for example.

Moreover, the present invention relates to a system for object marking in sensor data. The system may be operated in particular according to the above-described method, and accordingly refined according to one or multiple of the above-described embodiment variants. In accordance with an example embodiment of the present invention, the system includes at least one, preferably optical, sensor for detecting a scene, and a data processing device, for example a computer with a processor, a memory, and/or the like. The data processing device is configured to associate a first object marking with at least one object contained in the scene in a first data set containing the scene in a first state, and to at least partially accept the first object marking, contained in the first data set, for the object recognized in a second state of the scene as a second object marking in a second data set.

According to one refinement of the present invention, the system may include a second sensor for the location and/or position determination during the detection of the scene, the location and/or position determination being associatable with the detected scene, i.e., in particular, the first data set. The second sensor may, for example, include one or multiple sensors, for example for GPS location, for proper motion determination, or the like.

Further measures that enhance the present invention, together with the description of the preferred exemplary embodiments of the present invention, are discussed in greater detail below with reference to the figures.

BRIEF DESCRIPTION OF THE DRAWINGS

Advantageous exemplary embodiments of the present invention are described in greater detail below with reference to the figures.

FIG. 2 shows a practical application of the method, using the example of a roadway course.

The figures are strictly schematic and are not true to scale. Identical, functionally equivalent, or similar elements are consistently provided with the same reference numerals in the figures.

DETAILED DESCRIPTION OF EXAMPLE EMBODIMENTS

Figure 1:
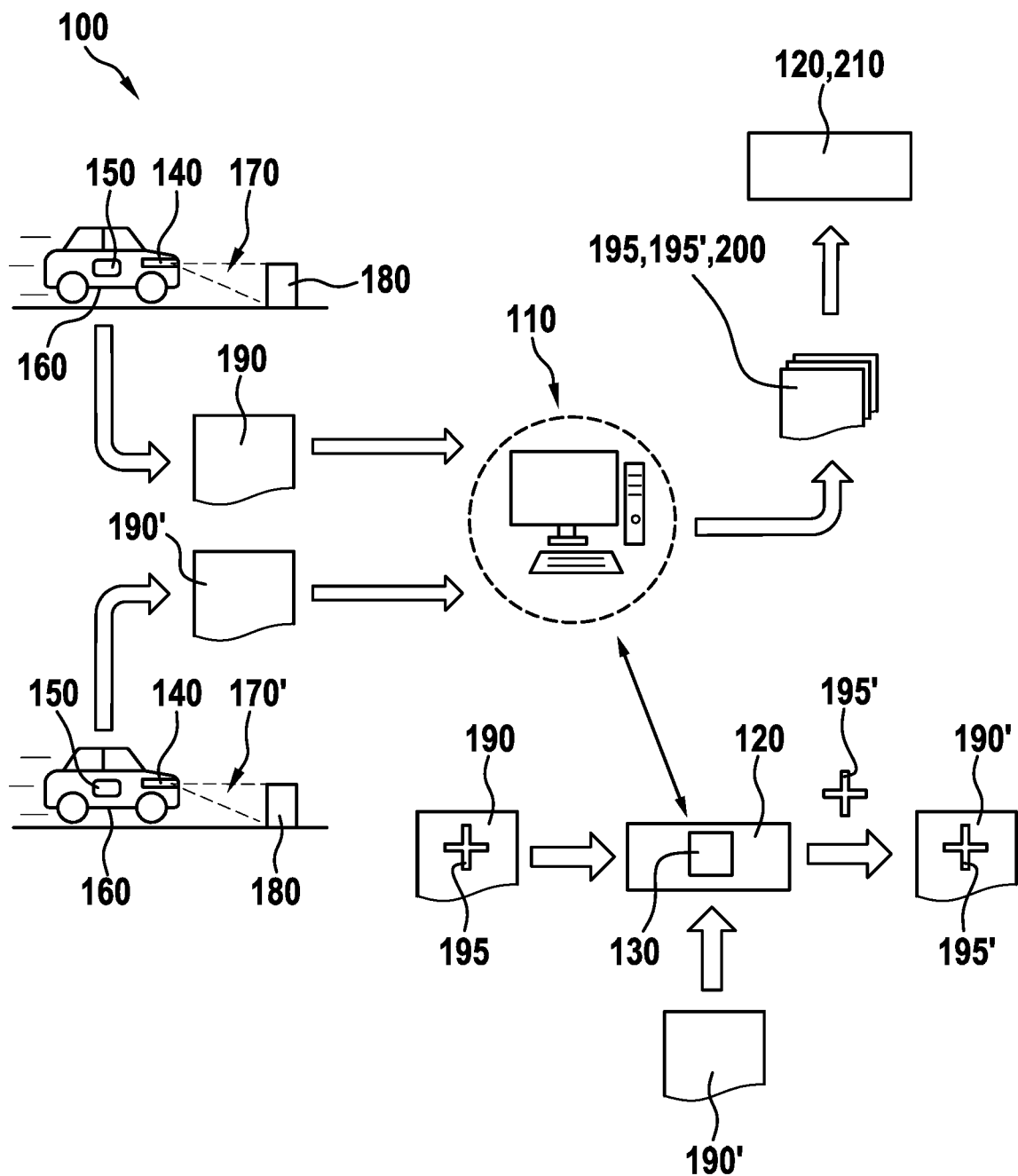
FIG. 1 shows a diagram of a system that may be operated using a method based on the present invention.

FIG. 1 shows a diagram of a system 100 that is suitable for semiautomatedly and/or completely automatedly marking or annotating an object or an object class that is recognized in an image or in an image sequence.

System 100 includes a data processing device 110 which may include a processor, a memory device in particular for program code, etc. In this exemplary embodiment, data processing device 110 includes at least one artificial intelligence module 120 (AI module for short), which as an example is configured for pattern recognition in an image or in an image sequence via a multilayer artificial neural network 130. In addition, the system includes at least one first sensor 140 that is designed as an optical sensor, for example as a camera, and at least one second sensor 150 for location and/or position determination. In the present case, sensors 140, 150 by way of example are situated at or in a motor vehicle 160, and may also be borrowed from some other vehicle system. Thus, first sensor 140 may be part of a driving assistance system that may also be configured for an autonomous driving operation of motor vehicle 160. Second sensor 150 may be part of a navigation system, an odometry system, or the like.

System 100 may be operated using the method described below.

Motor vehicle 160 is initially moved through a scene 170, which in the present case by way of example is a traffic situation that includes an object 180 which, for example, may be a static object in the form of a roadway course, a traffic sign, etc. This scene 170 is recorded in a first state as an image or image sequence with the aid of first sensor 140 and stored in a first data set 190. The first state of scene 170 corresponds, for example, to daytime travel of motor vehicle 160 through the scene, in the present case a corresponding daytime illumination of the scene being assumed. Based on the location and/or position determination by second sensor 150, a piece of location information, the location at which the scene was recorded, and a piece of viewing angle information and/or a piece of position information is/are also retained in first data set 190.

The identical or at least similar scene is recorded again in a second state that differs from the first state, for which reason the newly recorded scene in the second state is denoted by reference numeral 170' in FIG. 1. This corresponds by way of example to nighttime travel of motor vehicle 160 through scene 170', in the present case corresponding nocturnal surroundings being assumed. In addition, it is assumed that object 180 is still part of scene 170'. This scene 170' in the second state is stored in a second data set 190'.

In addition, first data set 180 is supplied to data processing device 110, and with the aid of AI module 120, for example manually or semiautomatedly, optionally also completely automatedly, object 190 is marked with a first object marking 195, i.e., an annotation. First object marking 195 may, for example, be a highlighting of a roadway course.

Second data set 190' is also supplied to data processing device 110 and processed therein. AI module 120 is also configured to recognize object 180 in second data set 190' and to associate with it a second object marking 195', which for an unchanged object 180 is identical to first object marking 195 in first data set 190. For the (re-)cognition of scene 170' and/or of object 180, AI module 120 falls back on the information concerning location and position of the recording of scene 170, which is stored in first data set 190. As a result of the processing by AI module 120, second data set 190' now also contains similar or identical scene 170' and second object marking 195'.

As indicated in FIG. 1, first and second data sets 190, 190' are used as a training data set 200 for AI module 120 itself or for another AI module 210, which for example may also be part of an autonomously driving vehicle.

FIG. 2 shows on the left side an example scene 170 in which object 180 is a roadway course, which is already provided here with first object marking 195. It is assumed that during the recording of scene 170, comparatively poor weather prevails and therefore the visibility is slightly limited. On the right side of FIG. 2, scene 170' is recorded again under clearer weather conditions. AI module 120 has (re-)cognized scene 170' and has automatically associated second object marking 195' with object 180, i.e., the roadway course.

Proceeding from the illustrated exemplary embodiment, system 100 and the above-described method may be modified in many ways. Thus, for example, it is possible that a depth prediction, for example monocular, may be carried out by a stereo depth estimation, an estimation of the optical flow, and/or based on LIDAR data, of the image that already includes the first object marking, based on first data set 190. A prediction of a semantic segmentation in the unknown image, i.e., the second data set, may also be carried out. Furthermore, it is possible for first object marking 195 to be transformed in order for the object marking to more precisely fit the new image of second data set 190'. This transformation is also known as "warping." In addition, it is possible to use a simultaneous localization and mapping (SLAM) method in order to obtain a better location and position determination. It is also possible for artificial neural network 130 to provide a pixel-by-pixel match mask as output. This may form a good basis for manual, semiautomatic, or completely automatic further processing. In addition, it is possible, in particular via the SLAM method, to determine at least one distinguishing feature of scene 170, 170' between the first state and the second state, and to associate second marking object 195' with the distinguishing feature, at least when the distinguishing feature, for example the difference class, already has sufficiently good quality (for example, a statistical test with a high confidence level) and artificial neural network 130 shows a match for the remaining image content of scene 170, 170', for example an option being provided to automatically accept object marking 195.

What is claimed is:

1. A method for object marking in sensor data, the method comprising the following steps:

detecting a scene in a first state by at least one sensor as an image or image sequence;

associating a first object marking with at least one object contained in a scene in a first data set containing the scene in the first state;

detecting a similar or matching scene in a second state, which is different from the first state, by the at least one sensor;

and at least partially accepting the first object marking, contained in the first data set, for the object recognized in the second state of the scene as a second object marking in a second data set, wherein the acceptance of the first object marking takes place at least partially automatically by an artificial intelligence (AI) module that includes an artificial neural network that determines matching image areas of the scene in the first and second data sets and provides a pixel-by-pixel match mask as an output.

2. The method as recited in claim 1, wherein for recognizing the scene in the second data set, a piece of location information of the scene is associated with the first data set.

3. The method as recited in claim 1, wherein for recognizing the scene in the second data set, a piece of viewing angle information and/or a piece of position information of the scene is associated with the first data set.

4. The method as recited in claim 1, wherein the first data set and/or second data set is supplied to the AI module as a training data set.

5. The method as recited in claim 1, wherein at least one distinguishing feature of the scene between the first state and the second state is determined using a SLAM method, and the second object marking is associated with the distinguishing feature.

6. The method as recited in claim 1, wherein the scene in the second state is detected via an image sequence, and an unfavorable position from which the scene in the second state is detected is compensated for, based on at least one single image situated before and/or after the single image to be marked.

7. The method as recited in claim 1, wherein the first state and the second state of the scene differ due to weather conditions or light conditions.

8. A system for object marking in sensor data, comprising: at least one first sensor configured to detect a scene as an image or image sequence; and a data processing device configured to:
- associate a first object marking with at least one object contained in the scene in a first data set containing the scene in a first state;
- and at least partially accept the first object marking, contained in the first data set, for the object recognized in a second state of the scene as a second object marking in a second data set, wherein the acceptance of the first object marking takes place at least partially automatedly by an artificial intelligence (AI) module that includes an artificial neural network that determines matching image areas of the scene in the first and second data sets and provides a pixel-by-pixel match mask as an output.

9. The system as recited in claim 8, further comprising:
- a second sensor for location and/or position determination during the detection of the scene, the location and/or position determination being associatable with the detected scene.

* * * * *